Dec. 25, 1962 H. E. MILLS 3,069,801
FISHING LURE
Filed March 21, 1960

INVENTOR.
Herbert E. Mills.
BY
Balluff and McKinley
ATTORNEYS.

3,069,801
FISHING LURE
Herbert E. Mills, 5518 Bishop, Detroit 24, Mich.
Filed Mar. 21, 1960, Ser. No. 16,492
2 Claims. (Cl. 43—42.33)

This invention relates to fishing lures and has particular reference to certain novel features which make it possible to produce high quality, realistic, buoyant lures simulating the appearance of a small fish.

The invention also makes possible the incorporation of variations in the lure so that a line of lures may be economically produced with a minimum amount of tooling and manufacturing facilities.

A principal object of the invention, therefore, is to provide a new and improved fishing lure.

Another object of the invention is to provide a new and improved construction for fishing lures which makes it possible to produce a line of high quality, realistic lures with a minimum amount of tooling.

Other and further objects of the invention will be apparent from the following description and claims and may be understood by reference to the accompanying drawing which by way of illustration shows preferred embodiments of the invention and what I now consider to be the best mode of applying the principles thereof. Other embodiments of the invention may be used without departing from the scope of the present invention as set forth in the appended claims.

Figure 1:
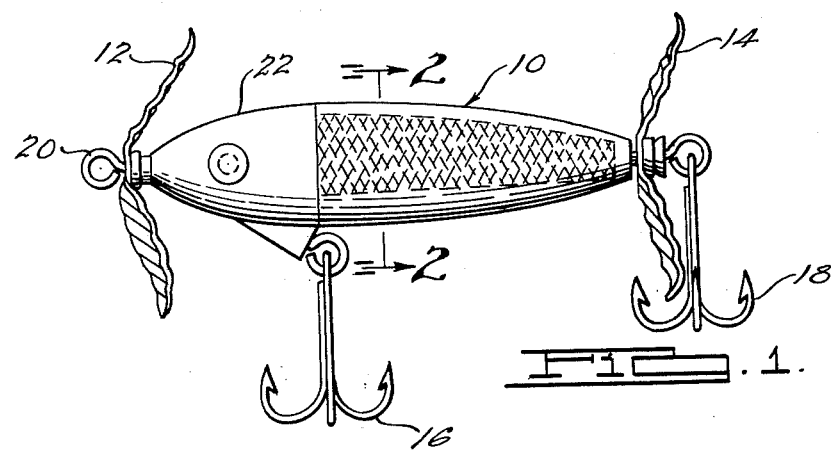
FIG. 1 is a side elevational view of a fishing lure embodying my invention.

As illustrated in FIG. 1, the fishing lure comprises a hollow body indicated generally at 10 having a front spinner 12, a rear spinner 14, and gang hooks 16 and 18 suitably attached to the body 10. It will be understood that any desired arrangement of hooks and spinners may be employed. The front spinner 12 is rotatable on the shank of an eye 20 secured to the head 22, the eye 20 forming a means for attaching a leader or fishing line to the lure.

The body in general comprises the head 22 and the main body portion 24, the same being hollow and preferably molded of plastic material, such for example as Tenite cellulose acetate butyrate. The plastic preferably is transparent and may have a slight amount of color, such for example as an amber tint.

Figure 4:
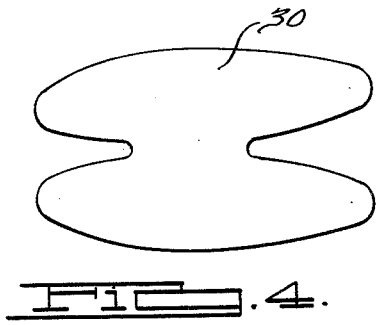
FIG. 4 is a plan view of the light reflecting element incorporated in the construction illustrated in FIGS. 1 2 and 3.

The head 22 and the main body portion 24 are injection molded as separate pieces and are made with mating edges so that when joined together as illustrated they will have a form simulating the appearance of a small fish. The inside of the main body portion 24 has a fish scale design 25 formed therein, the same being obtained on the interior surface of the main body portion 24 by reason of the fact that the core used in the injection molding process in the formation of the body 24 is provided with a suitable surface so as to produce the fish scale design 25. This fish scale design is illustrated only at the sides of the main body portion but it may be provided throughout the entire or any desired part of the interior surface thereof, if desired. While the fish scale design 25 is apparent from the outside of the body due to the transparent nature of the plastic material, I have found that the appearance of the fish scale design may be substantially enhanced by utilizing a light reflecting bright surface on the inside of the body adjacent the design, which may be done, for example, by applying a light reflecting element 30 which, as illustrated in FIG. 4, is shaped so that when rolled up it may be inserted within the main body portion 24 and closely conform to the interior surface thereof. The element 30 preferably projects forwardly of the main body portion 24 and into the head 22. This facilitates the insertion of the element 30 before the head 22 is joined to the body 24.

To securely locate the element 30 with reference to the fish scale design, I provide a pair of spaced longitudinally extending ribs 32 interiorly of the body along the lower side thereof so as to form abutments for engaging the opposite sides of the element 30 and thereby securing the same in position as illustrated in close contact with the design 25 on the interior surface of the main body portion 24. The light reflecting element 30 may comprise a piece of metal foil or paper coated with a suitable metal plating or color, such as silver or gold, on the surface thereof which is adjacent the interior surface of the main body portion 24. The interior surface of the main body portion 24 preferably is provided with a coating of lacquer having a gold or silver tint, depending upon the color desired. Preferably the color of the light reflecting surface of the element 30 is silver.

Figure 6:
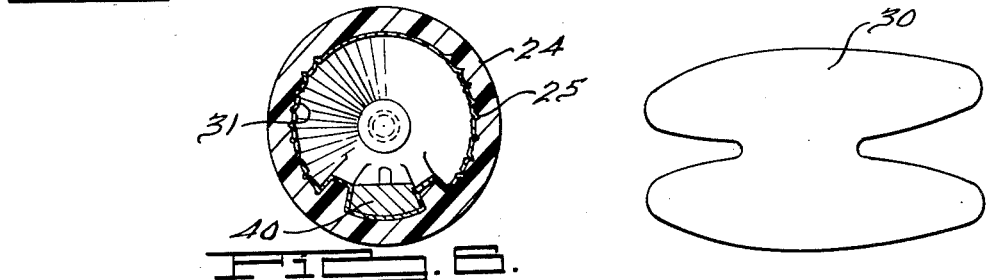
FIG. 6 is a sectional view similar to FIG. 2 illustrating a modified form of the invention.

Instead of using the light reflecting element 30, I may apply a silver plating or coating 31, such as that used for making mirrors, on top of the lacquer as illustrated in FIG. 6. Optionally other metal coatings may be applied in lieu of silver on the exposed surface of the color tinted lacquer coating, or to the interior surface of the main body portion 24 if the lacquer coating is not used.

The location of the fish scale design 25 on the interior surface of the body 10 backed up by a bright light reflecting surface greatly enhances the appearance of the scale effect as compared with the conventional technique of applying the same to the outside of the body. In addition, the inside scale design backed up by the light reflecting surface creates a mirror surface of many facets which flashes shafts of reflected light in many directions as the lure moves through the water.

Figures 2, 3:
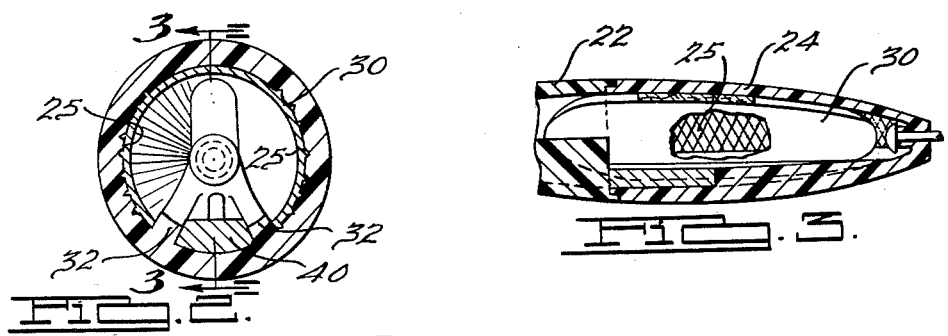
FIG. 2 is an enlarged sectional view taken on the line 2—2 of FIG. 1.
FIG. 3 is a fragmentary sectional view of the body taken on the line 3—3 of FIG. 2.

A lead weight 40 may be inserted between the ribs 32 and anchored thereby so as to maintain the body in the proper attitude when it floats. The mass of the weight 40 may be varied so as to control the buoyancy of the body 10. The mating surfaces of the head and the main body portion 24 may be joined together by any suitable bonding agent. However, when employing Tenite cellulose acetate butyrate it is possible by momentarily dipping the mating ends into a suitable solvent for such plastic to condition and soften the plastic sufficiently so that when the ends are joined as illustrated in FIG. 3 and the plastic hardens, the head and the main body portion 24 will be integrally united. Preferably the body 10 is coated externally with a suitable lacquer.

Figure 5:
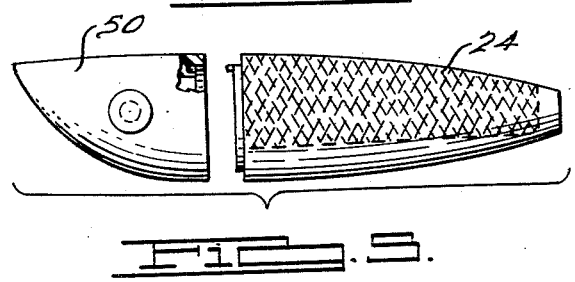
FIG. 5 is an exploded view of the body of the lure but showing a modified form of head.

As illustrated in FIG. 5, a head 50 of a different design than the head 22 and made of the same or different material may be assembled to the main body portion 24 so as to provide a different design of fishing lure. Thus the main body portion 24 may be assembled with any one of a series of heads so as to provide a variety of models of different shapes. In addition, by using lacquers of different tints on the interior surface of the body 24, and a variety of light reflecting surfaces, the appearance of the lure may be substantially changed. Hence by employing the foregoing features and selectively varying the same, a complete line of fishing lures may be obtained.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A fishing lure comprising an elongated hollow thin-walled body formed of transparent plastic material and a head secured thereto, said body with the head secured thereto having a form simulating the appearance of a small fish, said body having a smooth exterior surface and the interior surfaces of said body having a three dimensional fish scale design molded thereon, the interior of said body being provided with a pair of ribs defining a channel extending longitudinally of the bottom at the center thereof, a weight secured in said channel between and engaging the opposing sides of said ribs, and a sheet of light reflecting material in said body covering said design, the longitudinal edges of said sheet of material engaging the opposite sides of said ribs so as to be anchored thereby.

2. In a fishing lure, an elongated hollow thin walled body formed of transparent plastic material and having interior surface portions, a smooth exterior surface and a head forming a closure for said body and cooperating therewith the provide a form simulating the appearance of a fish, said body having a three dimensional fish scale design molded on the interior surface portions at the sides thereof, means providing a light reflecting surface on the inside of said body covering said design on said interior surface portions so as to enhance the appearance of the design when viewed from the outside of the body, the interior of said body being provided with a pair of ribs protruding inwardly from the interior surface portions of the body and defining a longitudinally extending dovetail shaped channel at the bottom of said body and a dovetail-shaped weight secured in said channel between and engaging the opposing side of said ribs, said light reflecting surface concealing said weight from observation when the lure is viewed from above.

References Cited in the file of this patent

UNITED STATES PATENTS

| | | |
|---|---|---|
| 1,535,957 | Stanley et al. | Apr. 28, 1925 |
| 1,740,335 | Cowan | Dec. 17, 1929 |
| 2,163,666 | Carter et al. | June 27, 1939 |
| 2,241,941 | Bates | May 13, 1941 |
| 2,309,521 | Mabee | Jan. 26, 1943 |
| 2,573,592 | Nickel | Oct. 30, 1951 |
| 2,575,139 | Smith | Nov. 13, 1951 |
| 2,596,201 | Bocchino | May 13, 1952 |
| 2,599,035 | Wing | June 3, 1952 |
| 2,716,831 | Glass | Sept. 6, 1955 |